United States Patent [19]

Swindell

[11] 4,221,070
[45] Sep. 9, 1980

[54] TRAPS FOR CRUSTACEANS

[76] Inventor: Samuel Swindell, P.O. Box 6454, Roggebaai, South Africa, 8012

[21] Appl. No.: 829,648

[22] Filed: Sep. 1, 1977

[30] Foreign Application Priority Data

Nov. 17, 1976 [ZA] South Africa .................. 76/6874

[51] Int. Cl.$^2$ .......................................... A01K 69/08
[52] U.S. Cl. ................................................ 43/100
[58] Field of Search .................. 43/100, 65, 64, 58, 43/105

[56] References Cited

U.S. PATENT DOCUMENTS

| 237,231 | 2/1881 | Atkinson | 43/105 |
| 2,726,478 | 12/1955 | Pullen | 43/100 |
| 3,271,894 | 9/1966 | Manno et al. | 43/100 |
| 3,497,989 | 3/1970 | Schultz et al. | 43/100 |

FOREIGN PATENT DOCUMENTS

| 672575 | 10/1963 | Canada | 43/100 |
| 2331281 | 6/1977 | France | 43/100 |

OTHER PUBLICATIONS

World Fishing, Nov. 1971, p. 79, A & L Guillouard Advertisement.

*Primary Examiner*—Othell M. Simpson
*Assistant Examiner*—Roscoe V. Parker

[57] ABSTRACT

A trap for crustaceans and fish comprising a plastic mesh forming walls in the shape of a hollow hexagonal prism, made up of two trough shaped parts and end walls. End walls contain frusto conical inlets and interchangeable end walls are closed. Ballast in the shape of elongate extruded hollow square section plastic tubes filled with concrete is fixed to one trough shaped part, an opening in the other trough shaped part can have a frusto conical pipe extending into the trap or a lid, for removing the catch. Tongue and socket connectors for the trough shaped parts have a cross sectional shape for the tongue like a capital letter E with the middle web longer than the outer webs. A bait basket is in two halves which are threaded onto a pin which has a handle at one end and a detent at the other end to clip into a socket in the inner surface of the trough shaped part which carries the ballast.

2 Claims, 14 Drawing Figures

TRAPS FOR CRUSTACEANS

BACKGROUND OF THE INVENTION

This invention concerns improvements in and relating to traps for all species of fish and in particular crustaceans such as lobsters and crayfish.

FIELD OF THE INVENTION

Description of the Prior Art

The catching of lobsters and crayfish by means of traps is a very old art which has been practised by fishermen for these crustaceans using hand made traps of wood or wicker and metal traps, set in relatively shallow waters for example up to five or six fathoms at the most and generally shallower than this.

Very recently fishing for lobsters and crayfish has been extended to much greater depths thereby entering heretofore unexploited fishing fields and employing traps and techniques which have very substantially increased the yields. Despite these increased yields however this fishing is still an art deriving many of its techniques and many aspects of construction of the traps from the practice of the past rather than from a clear understanding of the behavior of the crustaceans in relation to the trap. Accordingly the yields provided by traps and techniques of different kinds have differed from each other for reasons which have not always been clear. Continuing experience in this art however in particular in relation to deep sea trapping of crustaceans has now yielded to the inventor an understanding of certain of these aspects which has led to a development of traps for crustaceans having novel features which provide improved yields.

SUMMARY OF THE INVENTION

There are many features which are important for the effective trapping of crustaceans. A first feature is the employment of a non-galvanic material in sea water such for example as a suitable plastic or synthetic polymer. Apart from its asset of not rusting in sea water it is believed that for example a lobster is able to sense metal under water and tends to be repelled by it accordingly, presumably due to electrical polarising or galvanic effects.

A further important feature is collapsibility so as to permit reasonably compact stacking of collapsed components of the traps. Combined with this it is desirable that the assembled trap nevertheless be sufficiently strong to permit walking on top of a trap by adults without damage to it. The reason for this is that traps tend to be stacked in very large numbers (and sometimes in more than one layer) in the assembled condition all over the entire deck of a fishing vessel so that the fishermen are forced to walk over the tops of the traps. Also when the traps are raised from a depth in the case of deep sea fishing with lobsters inside them they are subjected to very large forces as the cable is hauled up dragging the traps through the water. Under these conditions it is furthermore important that the entrance to the trap be such that they tend to prevent or minimise escape from the trap of the crustaceans trapped inside it. Thus preferably the entrance to the trap is adapted to permit easy passage to the crustacean from outside to the inside of the trap but to tend to hinder the crustacean from passing from inside to outside. The features of construction of the entrance to achieve this may for example comprise a plurality of fingers arranged around the entrance and directed inwardly towards the inside of the trap. Preferably the entrance is of converging cross section from outside towards the inside, terminating in the fingers which are directed inwardly. On the other hand certain authorities insist on traps which provide for the eventual escape of crustaceans from those traps which have been lost on the bottom for example due to parting of haulage cables and cords.

The positioning of the entrance to the trap also plays an important part since if the traps happens to fall on the sea bottom with the entrance lying on the bottom the entrance may be partially or completely occluded and prevent crustaceans from entering the trap. Thus preferably more than one entrance is provided, in diametrically opposed surfaces of the trap. Thus if one surface rests on the bottom then the probability is that the other surface will be exposed for access of crustaceans. Preferably further the overall proportions of the trap are such that the length dimension substantially exceeds the height and width dimensions of the trap so that the trap is of generally elongated form and in these proportions the trap is preferably provided with two entrances located in the walls which are defined by the width and height of the trap that is the end walls or the walls which are generally orthogonal to the longest dimension of the trap. This feature is preferably combined with the provision of weights in the trap located against one of the side walls of the trap. The effect of these weights is to tend to make the trap unstable if it happens to initially fall on one of its end walls, that is with its longest dimension upright and the trap will tend to then tip over and fall down with its longest dimension substantially horizontal thus leaving the end wall substantially upright and their openings generally unobscured for access of crustaceans. This arrangement also has the advantage that the entrances will be at a readily accessible level for the crustaceans such as lobsters which generally tend to crawl over the bottom rather than providing the entrance on a surface which would tend to be at the top of the trap when its rests on the sea bottom thus requiring that the lobsters for example will have to crawl up the side of the trap onto the top and only then go into the entrance. Furthermore an important feature is preferably that the wall which contains the entrance is given a mesh construction which is well adapted to serve as a ladder for the crustacean to climp up to the entrance to the trap. Thus the spacing between the members of the mesh is preferably quite small for example of the order of 14 mm or less so that the crutacean is easily able to step from one transverse element of the mesh to the one above and thus easily reach the entrance to the trap.

All of these features, any one of which may provide only a marginal advantage together are important because for a given time period of the trap on the bottom of the sea it will accumulate a larger number of crustaceans and when it is hauled up it will tend to lose fewer from the trap. Alternatively the trap can be left on the bottom for a shorter period of hours than is the practice at present and still have the same yield. This is important not merely from the point of view of obtaining a given catch in a shorter number of hours but also because the fishing is subject to storms and other crises, occurrences such as the unexpected appearance of a very deep draught ocean going ship such as an oil tanker. The longer the period at which the traps are left on the sea bottom the longer they are exposed to a risk of this kind and therefore the larger the probability over a season that calamities will occur. Generally when a storm arises the traps have to be hauled up quickly so as to save them and ensure that an entire cable or hawser carrying many traps is not lost. The same applies if a deep draught ocean going vessel approaches.

The containing of the bait in the trap is always an important feature and the container for the bait is preferably an open mesh basket. The reason for this is to permit sea lice or mites to reach the bait and the breaking up of the bait which results, to freely allow tiny particles of bait to float into the surrounding water which may be an important mechanism for the attraction of crustaceans to the trap. Preferably the bait basket is adapted to be let into one wall of the trap, preferably a wall which will lie on the sea bottom. Thus the bait basket is preferably aligned on the same wall as the wall on which the weights for the trap are provided. The bait basket may furthermore double as a hatch so that when the bait basket is removed an opening is left in the wall through which the trapped crustaceans may be removed from the trap.

A preferred overall form for the trap is a hollow prismatic hexagonal form, the walls all being formed of a suitable mesh. The cage is preferably collapsible by means of the end walls being separate pieces and the side walls being divided into two halves each generally channel shaped which may be nested for compact packing of the cage. The two halves will be connected by suitable arrangement of tongues and grooves, the end walls being keyed in position when the halves of the side walls are joined.

The weights for the trap can simply comprise a brick tied onto the side walls of the trap one at each end thereof. Alternatively special provision can be made for other types of weights.

A further factor which has been inferred from experience is that the more bait which is used the greater the attraction and accordingly preferably provision is made for the location of more than one piece of bait suitable inside the trap. Naturally the bait must be so located that it cannot be reached from outside the trap by crustaceans and is preferably located so that it tends to lead the crustaceans to the entrance of the trap. A practical arrangement in one embodiment is to provide two bait baskets in the trap.

It is convenient for the openings in the mesh of the cage or a special opening to be of such a size that they allow crustaceans to escape which are smaller than the legal limit which may be caught. This is preferable because if the undersized crustaceans are first raised to the surface and only then discarded they do tend to deteriorate from being raised to the surface and it is believed very often die after they have been returned to the sea. It will be appreciated this type of deep sea fishing is commonly carried out at sixty to eighty fathoms by the long line method in accordance with which a large number of traps are attached to a long hawser which is lowered from the fishing vessel. It is convenient to provide a hatch in an upper surface of the trap for removal of the catch. This hatch can be given a lid which can be fixed in the hatch (e.g. by a bayonet type connection) and easily removed.

BRIEF DESCRIPTION OF THE DRAWINGS

The invention will be more fully described by way of example with reference to the accompanying drawings in which some examples are illustrated.

In the drawings.

DESCRIPTION OF THE PREFERRED EMBODIMENT

Figure 1:
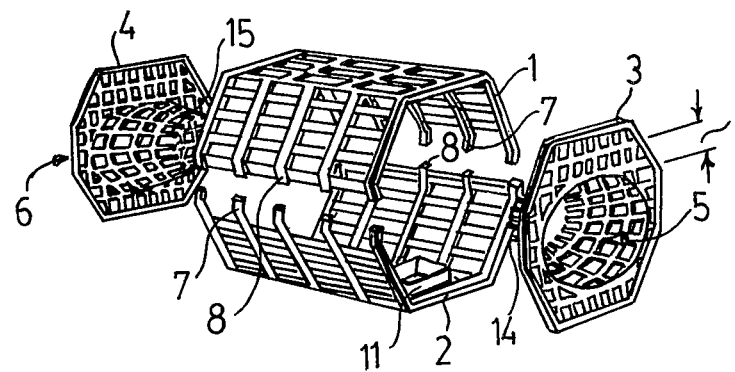
FIG. 1 is an exploded perspective view of a lobster and crayfish trap in accordance with a preferred embodiment of this invention
Figure 2:
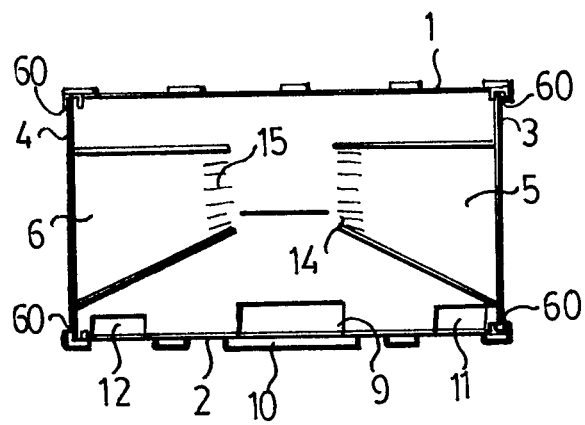
FIG. 2 is a schematic side elevation of the trap shown in FIG. 1.
Figure 3:
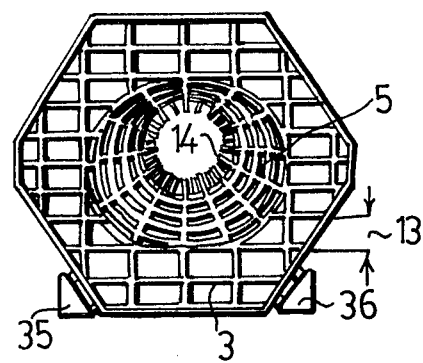
FIG. 3 is a schematic end elevation of a trap shown in FIG. 1.

As shown in FIGS. 1 to 3 the traps comprises four separate parts from which it is assembled and into which it can be disassembled at any stage. The overall shape of the trap as can be seen approximates to a hollow hexagonal prism with all of the walls being an open mesh. The side walls are divided into two trough shaped parts 1 and 2 respectively and the two end walls 3 and 4 are flat and contain the entrances 5 and 6 respectively. The two side walls parts 1 and 2 are of trough like shape and can be nested together for compact packing. They are moreover identical with each other save that the bottom part 2 is adapted to receive a bait basket 9 for carrying bait. The two halves 1 and 2 can be joined together by means of tabs 7 locking into sockets 8 in a manner which permits releasing them again with the use of for example a screwdriver. Before the two parts 1 and 2 are joined together however the end walls 3 and 4 are notched into channels 60 which face inwardly at the opposite ends of the parts 1 and 2. When the parts 1 and 2 are thus joined together the end walls 3 and 4 are locked into position in the channels 60. Part 2 as stated is adapted to receive a bait basket 9 (visible in FIG. 2) the lower surface 10 of which serves also as a closure hatch for a circular opening provided in the part 2. If the bait basket 9 is removed this thus leaves an opening in the part 2 through which the catch can be removed. Weights 11 and 12 are also fixed onto the bottom of the part 2. As can be seen the end walls 3 and 4 comprise a mesh in which the cross bars are carefully spaced at desirable distances apart indicated in FIG. 1 by the distance indication 13. This amount is chosen so as to make it easy for lobsters for example to climb up the end wall and enter the entrance 5 or 6. The shape of the entrances 5 and 6 is conical as can be seen and fingers 14 and 15 project inwardly at the entrances 5 and 6 respectively. These fingers are designed to tend to collapse together but because of their direction are easily pushed open if necessary by a crustacean entering the trap. The contrary applies if it tries to leave the trap when the fingers will tend to get hooked in the creature and deter it from such attempts. As can be seen apart from being frusto-conical the entrances also tend to raise the internal entrance some distance from the bait basket 9 so that the animal is obliged to enter the trap fully in order to get at the bait. Also the closure member 10 constituting a lower wall of the bait basket can be made solid if desired so as to prevent access to the bait for a crustacean from the outside of the trap. This external wall can also be of larger diameter than the diameter of the bait basket itself for the same reason. Preferably the bait basket 9 is some distance (one to two inches) above the base for the same reason.

Figure 4:
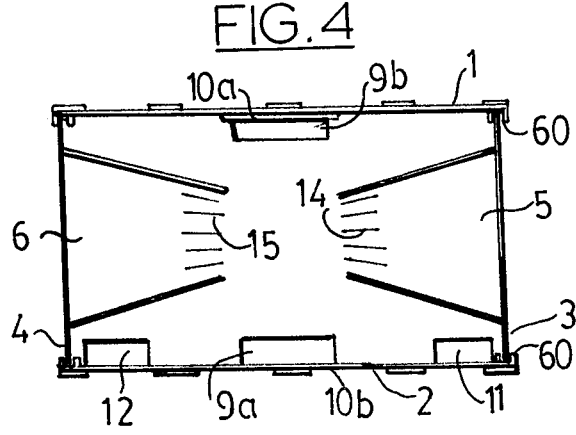
FIG. 4 is a schematic side elevation of a slightly modified embodiment.
Figure 8:
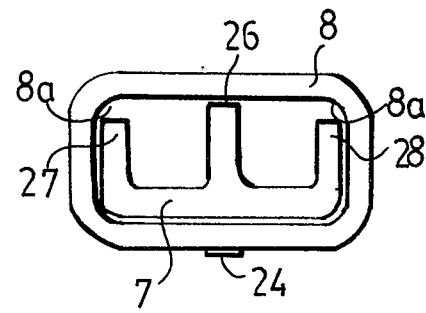
FIG. 8 is a detail plan view of spigot and socket of the trap shown in FIG. 5.

As shown in FIG. 4 for example two bait boxes 9a and 9b can be provided, other features being the same and being indicated accordingly with the same numerals. This will permit more bait to be placed in the trap which is believed to provide a stronger attraction and may be preferred for this reason.

The construction of the framework is such to give it strength and accordingly the use of ribs and structural cross sections for the mesh is resorted to.

The embodiment of FIG. 4 can also be used by removing the bait basket 9(b) and replacing it with a removable lid (not shown). This lid can be useful for removing the catch from the trap—alternatively the bait box serves as a lid and when removed allows removal of the bait.

Figure 5:
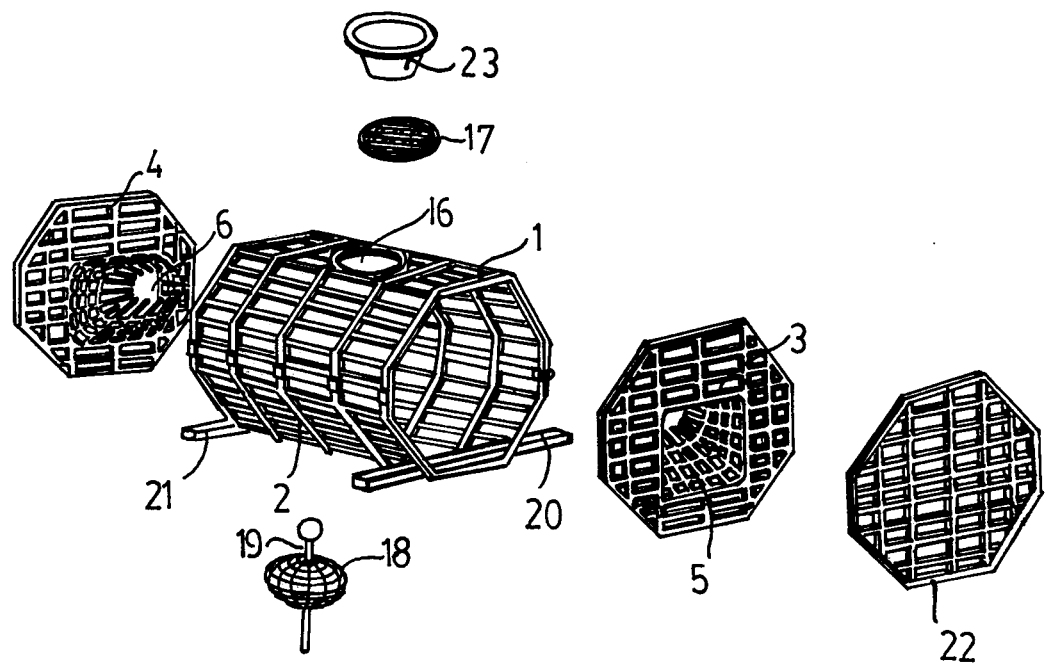
FIG. 5 is a perspective view of parts of the preferred trap in accordance with this invention, in "exploded" view, showing certain alternative parts.

In FIG. 5 an embodiment is shown in "exploded" view showing several alternative components of the trap. The trap comprises two trough shaped parts 1 and 2 again, and two end walls having entrances 5 and 6 respectively. The upper trough shaped part 1 has a hole 16 in which a lid 17 can be fixed by means of a bayonet type connection. A bait basket 18 comprises two halves joined together on a pin 19; the lower end of the pin 19 is pressed into a socket in the inner surface of the floor of the lower trough shaped parts 2 when the trap is assembled. Two bars 20 and 21 are fixed (removably) in the lower trough shaped part 2, projecting transversely from the sides of the part and located near opposite ends of it. They are extruded plastic rectangular-section tubes which are filled with set concrete.

This FIG. 5 shows an alternative end wall 22 which may replace one of the end walls 2 or 3. It also shows a frusto conical cylinder 23 which may replace the lid 17. This opening may be insisted on by some authorities so as to ensure an escape from the trap after a time if the trap is lost on the bottom of the sea.

Figure 6:
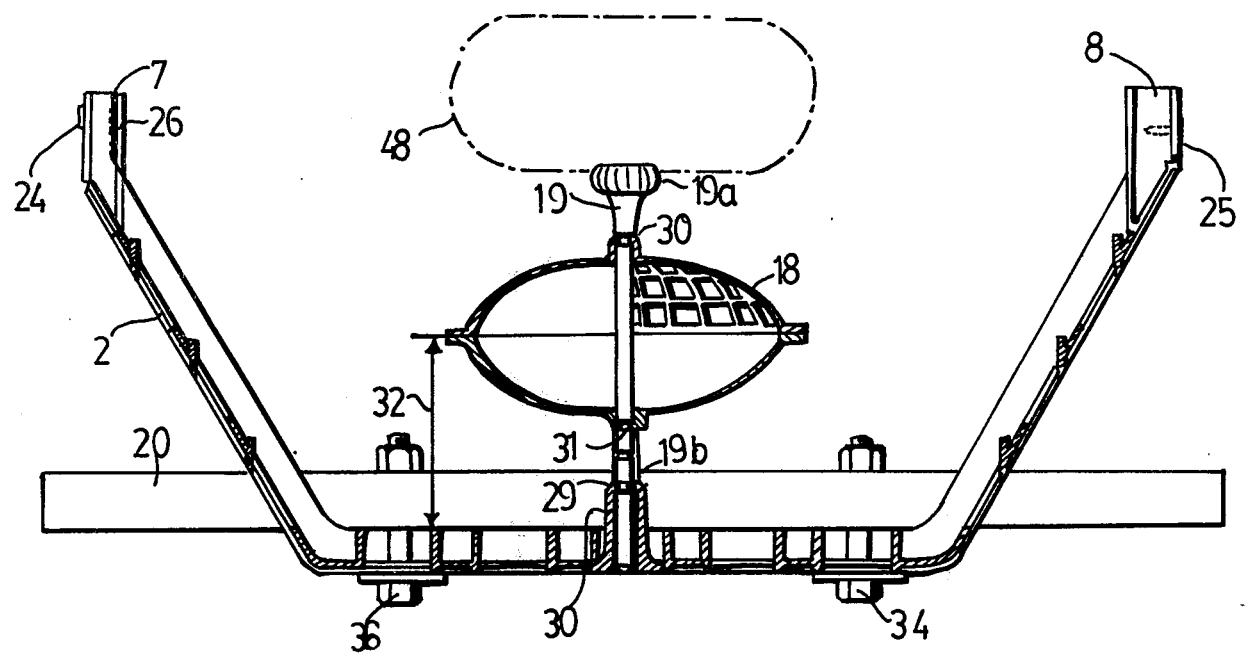
FIG. 6 is an end elevation of one part of the trap shown in FIG. 5.

FIGS. 6 to 13 inclusive show the trap of FIG. 5 in greater detail. In FIG. 6 a lower trough 2 is shown in end elevation. It is moulded with five tongues 7 along one side and five grooves 8 along the other. The upper trough which will fit it is identical except for the hole 16 which is moulded by substituting a special insert in the mould. The tongue 7 will fit into grooves 8 of an upper trough. A key 24 can lock in a hole 25. The tongue 7 has an important feature shown in FIG. 8 in particular, which is a central prong 26 opposite the key 24. This prong 26 ensures a snug fit of the tongue 7 in the socket 8 while the outer prongs 27 and 28, being shorter, do not exert a force on the corners 8a of the socket 8 which might weaken the socket.

FIG. 6 shows the bait basket in more detail. The rod 19 has a handle 19(a) for grasping and pulling the bait basket out of the trap and re-inserting it. The rod 19 has a circumferential groove 19(b) which is engaged by teeth 29 of a bush 30 which is moulded integrally with the lower part 2 of the trap. The two halves forming the oblate spheriodal shaped bait basket 18 are held together by clipping into similar circumferential grooves 30 and 31 in the rod 19. The height 32 of the bait basket 18 above the bottom of the trap 2 is functionally important and may be varied by providing alternative circumferential grooves to the groove 19(b).

The ballast bars 20 may for example weigh 10 kg each and they are attached by two bolts each 33 and 34. A possible alternative way of attaching the ballast is indicated in FIG. 3. Here the ballast 35 and 36 is again two elongated formations, arranged, however, longitudinally with respect to the trap instead of transversely. The ballast 35 and 36 is clipped into place with suitable formations, but if greater strength is needed bolts or binding wires can be used. (The bricks 11 shown in FIGS. 1, 2 and 4 are a further alternative). The bars 20 are extruded plastic square tubes in which concrete is cast—they are easily replaceable if damaged, and are economical to produce.

Figure 7:
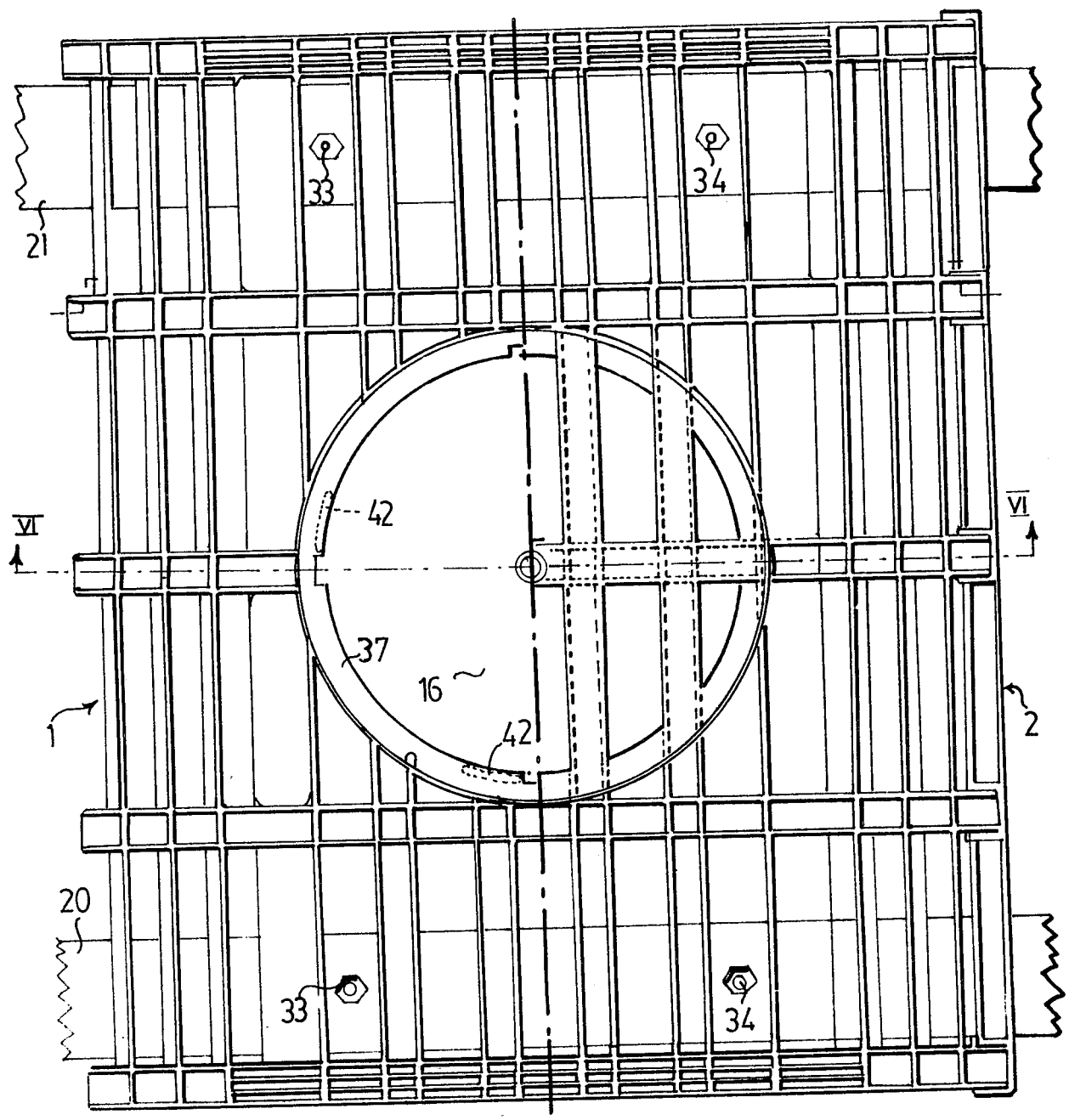
FIG. 7 is a plan view of the part of the trap shown in FIG. 6.

FIG. 7 is for purposes of illustration divided into a view on the left of the center line of the upper part 1 of the trap and on the right of the lower part 2 of the trap. This shows how the upper part 2 has the opening 16 moulded in it, while the lower part 1 has a continuous bottom mesh. The opening 16 is bordered by a circular flange 37 which has rebates 38 in it for entry of bayonet type connection formations 39 in the frusto conical funnel 40 or lid 41 (see FIGS. 12 and 13, respectively). Underneath the flange 37 retaining grooves 42 are moulded.

Figure 9:
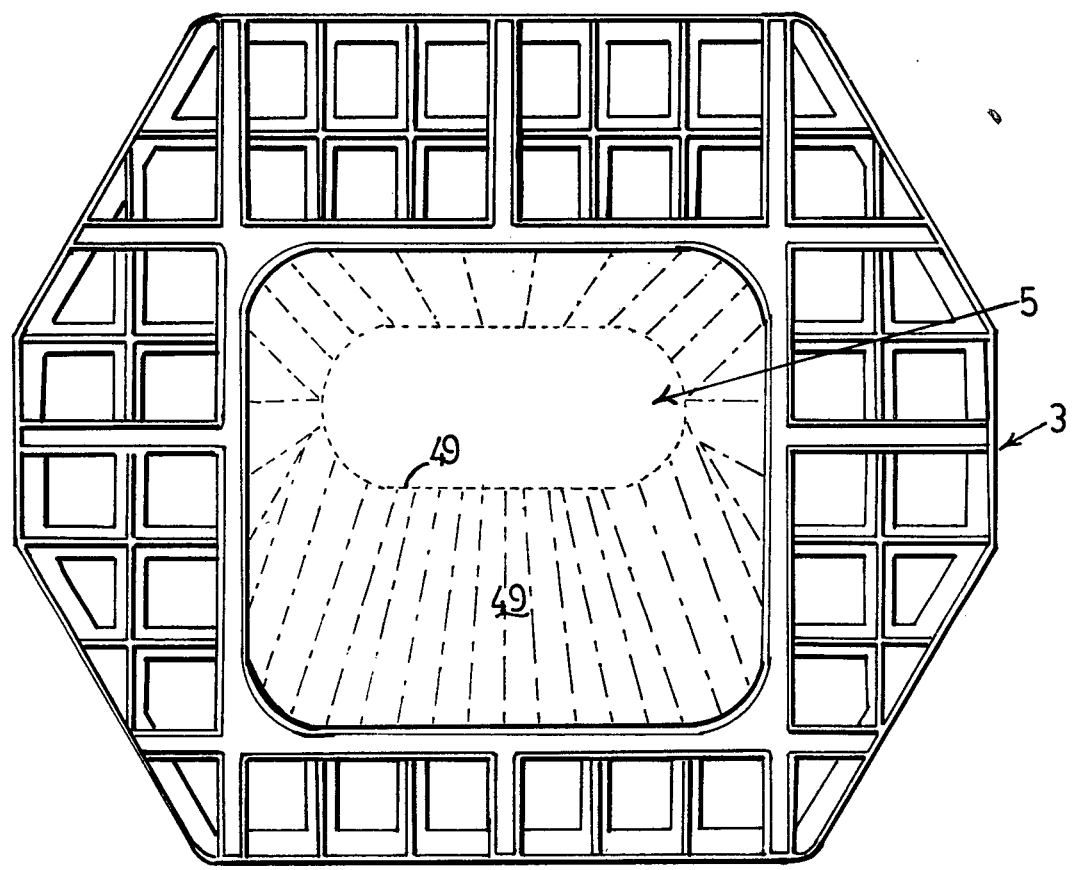
FIG. 9 is an end elevation of the end wall and entrance of the trap shown in FIG. 5.
Figure 10:
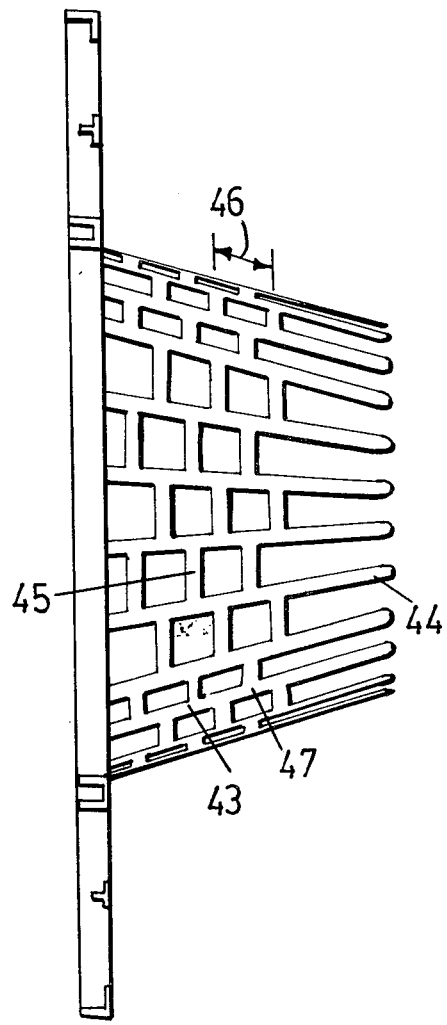
FIG. 10 is a plan view of the end wall and entrance shown in FIG. 9.
Figure 11:
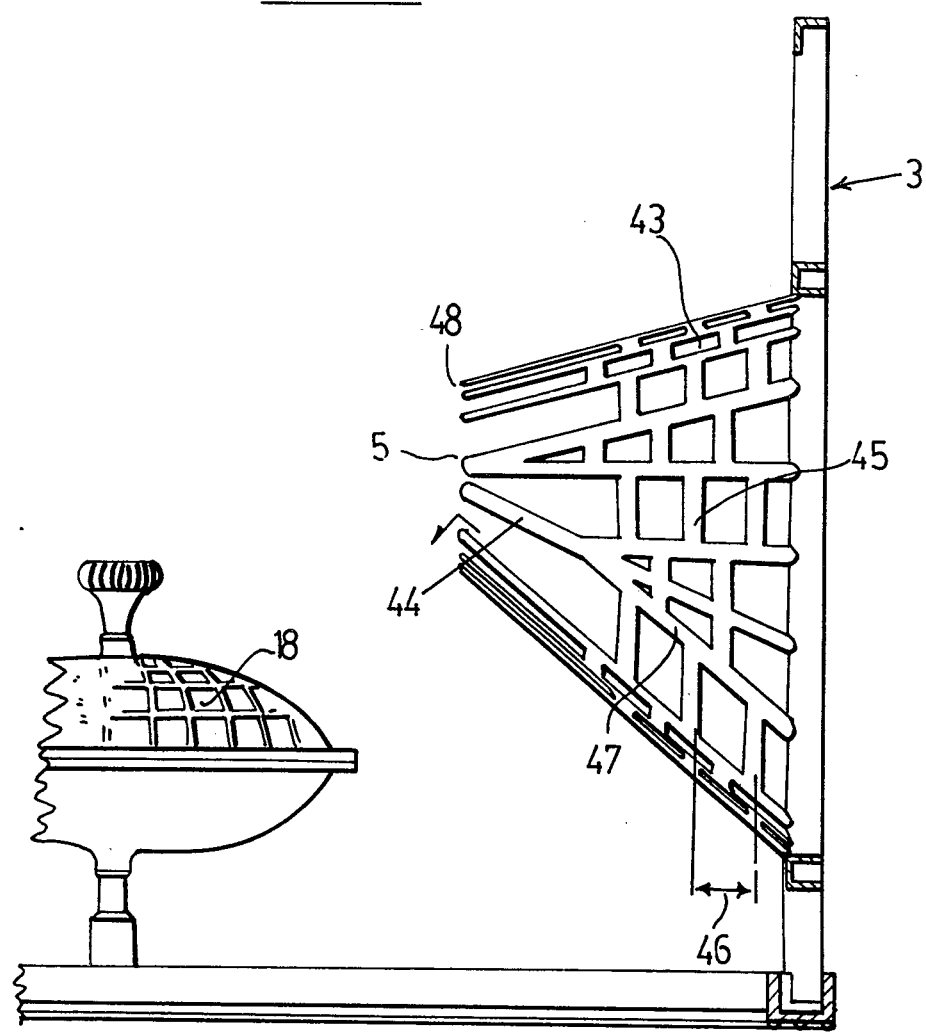
FIG. 11 is a front elevation of the end wall and entrance shown in FIG. 9.

In FIGS. 9, 10 and 11 the side entrance 5 is shown in more detail; it has several important features for its function. The entrance 5 is formed by a moulded mesh 43 of converging funnel shape, larger size at the end wall 3 and smaller size inwardly of the end wall. The mesh 43 terminates in fingers 44 which are convergent in conformity with the funnel shape. The mesh 43 comprises throughout transverse (i.e. cirumferentially oriented) connecting parts 45 which are spaced apart from each other by a distance 46 which is carefully determined to suit the crawling characteristics of a crayfish, and longitudinal (i.e. axially oriented) connecting parts 47 which terminate in the fingers 44. The transverse connecting parts 45 are staggered with respect to each other between different longitudinal connecting parts, giving a resilient mesh. The angle of taper of the upper and side portions of the funnel is 15° but the angle of taper of the lower portion is 40°, having the result that the inner entrance 48 is raised up sufficiently to locate it above the level of the bait basket 18. This is indicated in FIG. 6 and in FIG. 11. This factor and the horizontal distance of the bait basket from the inner entrance are pitched at enticing the crustacean sufficiently far into the trap that it tends to pass right through the entrance or sufficient of its body to protrude into the trap from the inner entrance 48 of the funnel 5 for the fingers 44 to prevent it retracing its steps out of the trap. The funnel shaped entrance 5 is moreover not of circular conical shape but is flattened at top and bottom. This gives a bottom portion 49 which is wide and flat, providing an accommodating surface for the crustacean to walk up.

The distance 46 is not less than 10 mm and not more than 50 mm, preferably about 30 mm, at least on the lower portion.

Figure 12:
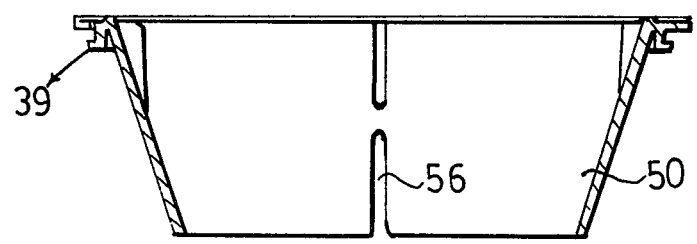
FIG. 12 is an elevation of a part of the trap shown in FIG. 5, (sectioned)

FIG. 12 shows a frusto conical cylinder 50 which can be inserted in the opening 16 in the upper part of the trap. It can serve several useful functions including providing a ready opening for removing the catch, for removing and replacing the bait basket, and as a means of escape from the trap if it is lost on the sea bottom due for example to a hawser parting. This escape is important because if trapped crustaceans eventually die in a lost trap they rot and contaminate the surrounding water, driving away living crustaceans.

Figure 13:
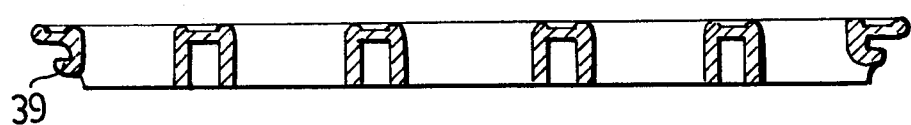
FIG. 13 is an elevation of another part of the trap shown in FIG. 5.

FIG. 13 shows a lid which can be fixed (removably) in the opening 16, having the same bayonet connection lugs 39.

Figure 14:
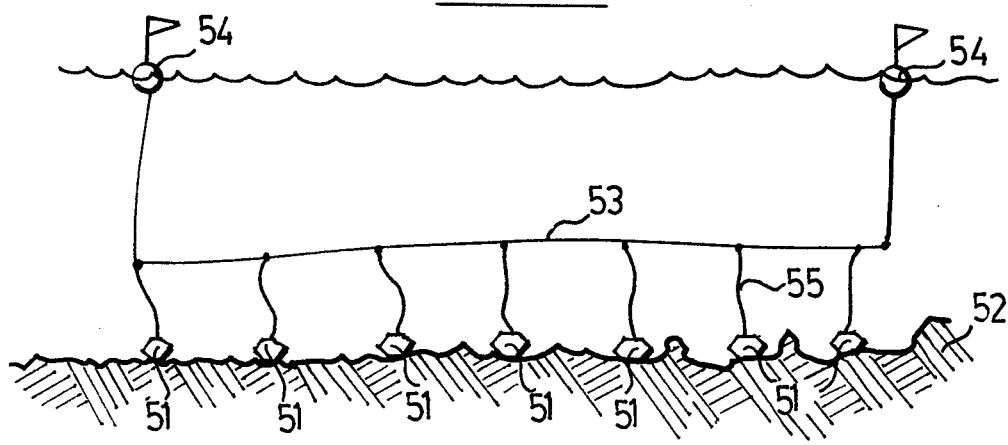
FIG. 14 is a schematic elevation showing traps in use at sea.

FIG. 14 is a schematic illustration of one way of using the traps. The traps 51 all rest on the sea bottom 52. A main hawser 53 is located by two buoys 54 and each trap 51 is tied to the main hawser by ropes 55.

The hexagonal prismatic shape is considered to be important as it allows the trap to right itself under the weight of the ballast. It is felt that the shape allows the trap to wedge in coral and rock with a reduced danger of getting caught up.

The frusto conical cylinder 50, shown in FIG. 12, may have one or two slits 56 in its wall as shown. The slit 56 can be used to tie bait to the outer surface of the cylinder inside the trap; the bait is tied to the end of a length of string, the string is hooked into the slit with the bait outside the cylinder (inside the trap) and the free end of the string is pulled tight and secured.

The cylinder 50 can of course serve as an entrance for crustaceans. The relative effectiveness of this entrance compared to the side entrances has been tested using six test traps, three having side entrances 5 only (with lid 17 in the opening 16) and three having both closed end walls 22 and cylinder 23 in the hole 16. Initially tests were done in tanks and later at sea. Each trap, fully baited, was placed into a separate tank for 30 minutes simultaneously. Then the traps were rebaited and interchanged between tanks for a further 30 minute period, as far as possible subjecting all traps to identical conditions. The catches were:

| Date | Top (cylinder) Entrance Trap | Side Entrance Trap |
|---|---|---|
| 4.12.76 | 1 lobster | 12 lobsters |
| 14.12.76: | | |
| Tank 1 | 12 lobsters | 18 lobsters |
| Tank 2 | 12 lobsters | 6 lobsters |
| Tank 3 | 4 lobsters | 16 lobsters |
| Tank 4 | 3 lobsters | 18 lobsters |
| Totals: | 32 lobsters | 70 lobsters |

Sea tests of two traps:

| Date | Top (cylinder) Entrance Trap | Side Entrance Trap |
|---|---|---|
| 8.12.76 | 2 | 20 |
| 16/17.12.76 | 1 | 4 |
| | 0 | 1 |
| Totals: | 3 | 25 |

These results suggest that the side entrance is much more effective.

What is claimed is:

1. A trap for crustaceans and fish which comprises a plastic mesh forming longitudinally extending walls and end walls whose shape in outline is approximately prismatic, the cross-sectional shape of the prism being polygonal, the end walls being approximately parallel to each other, at least one end wall being provided with an entrance for crustaceans and fish, an opening formed in one of the longitudinally extending walls and being of sufficient dimension to permit removal of the catch through this opening, means for locating bait in at least one region of the trap, said region being accessible through said opening and being inaccessible to fish and crustaceans from outside the trap, ballast comprising two elogate bars which include ballast material, said bars being affixed to the trap at a side opposite the opening and extend substantially parallel to the end walls, one of said bars being near each of the two end walls, said bars extend through the interior of the trap, located against the inner surface of one of the longitudinally extending walls, with both ends of each bar projecting outwardly of the longitudinally extending walls whereby parts of the bars being located outwardly of the traps, said opening being adapted to receive a lid, a frusto conical cylinder removably fixed at its outer end in the opening, the cylinder extending into the trap with its large diameter end at the opening and the small diameter end being disposed within the trap, elogate bait slots formed in said cylinder and extending from its inner end and generally in an axial direction.

2. A trap for crustaceans and fish which comprises a plastic mesh forming longitudinally extending walls and end walls whose shape in outline is approximately prismatic, the cross-sectional shape of the prism being polygonal, the end walls being approximately parallel to each other, at least one end wall being provided with an entrance for crustaceans and fish, at least a first region of the trap in which ballast can be attached, means for attaching bait to at least a second region of the trap, said second region being inaccessible to fish and crustaceans from outside the trap, the longitudinally extending walls contain an opening of sufficient dimension to permit removal of the catch through this opening, the longitudinally extending walls are comprised in two trough shaped halves adapted to be joined together and with two end walls to form the trap, each of the two halves provided with tongues along one joint edge and with sockets along another one joint edge, the tongues of each half fitting in the sockets of the other half, each tongue comprising a cross-section similar to a capital letter E, the middle web of the shape being longer than the outer webs, and the socket cross-section being rectangular with rounded corners.

* * * * *